May 23, 1967     S. ZELNICK     3,321,353
FILM SEALING AND CUTTING APPARATUS
Filed Dec. 10, 1963     3 Sheets-Sheet 1
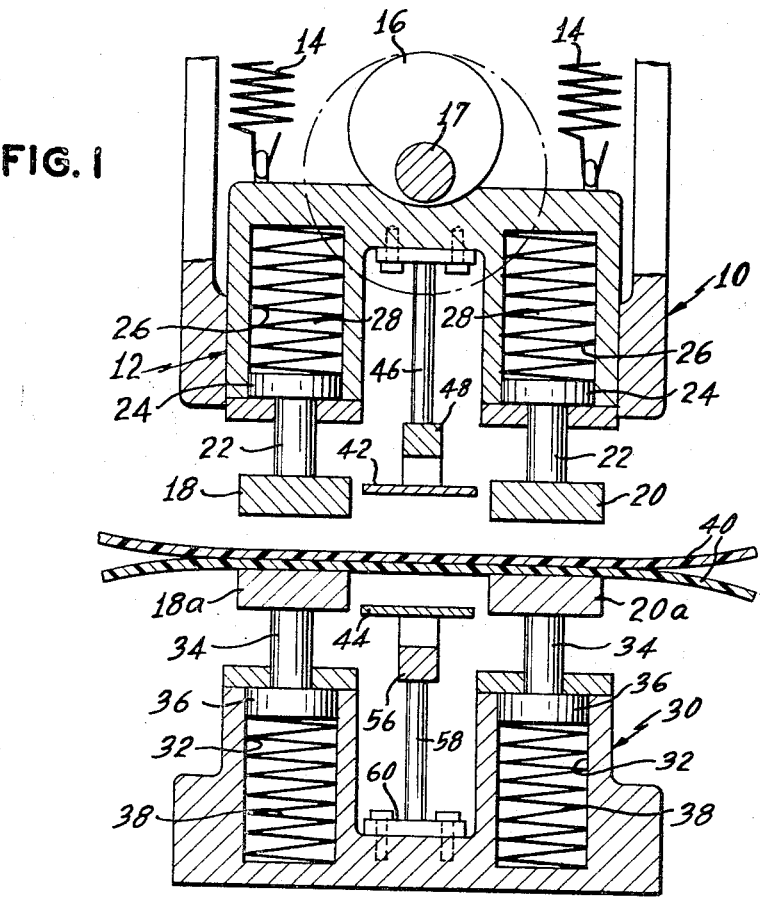
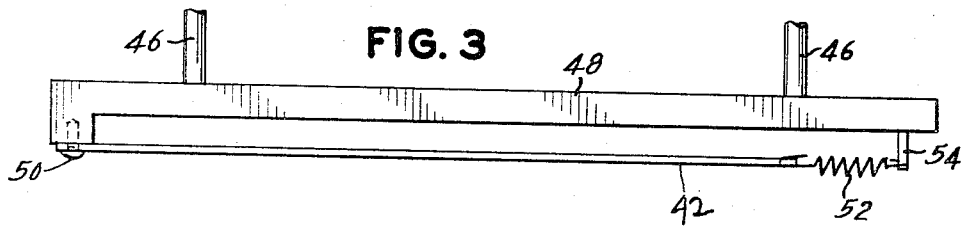
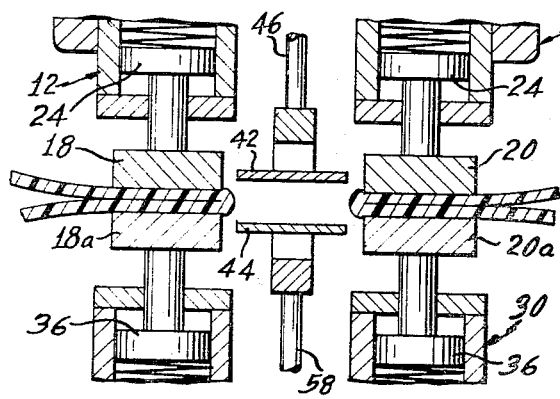
INVENTOR.
SEYMOUR ZELNICK
BY Harry Cohen
ATTORNEY

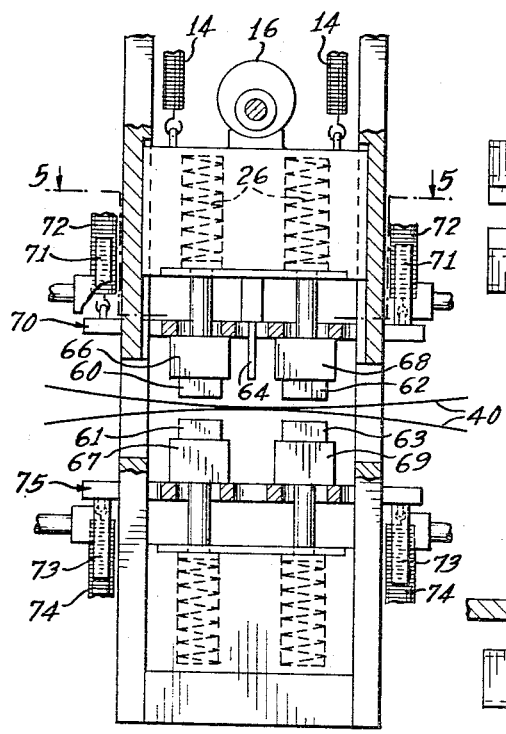
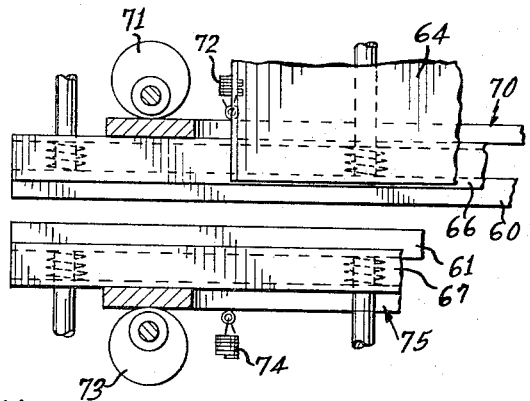
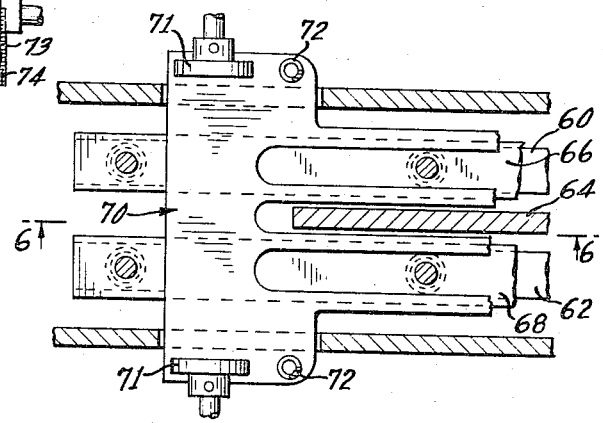
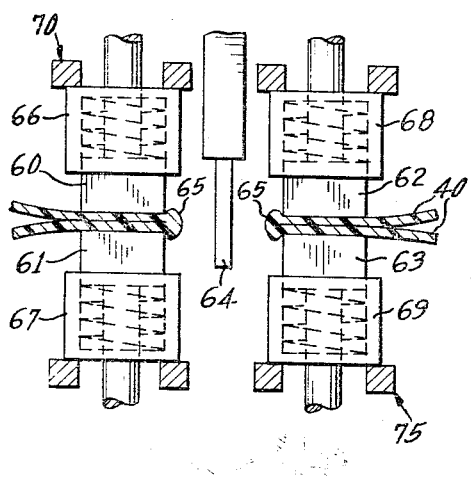
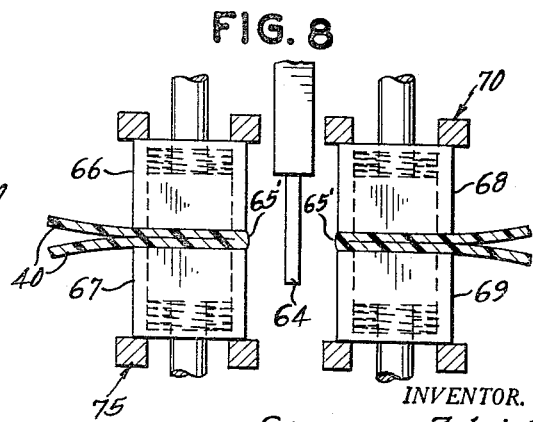

May 23, 1967

S. ZELNICK 3,321,353

FILM SEALING AND CUTTING APPARATUS

Filed Dec. 10, 1963

INVENTOR.
Seymour Zelnick
BY Harry Cole

ATTORNEY

United States Patent Office 3,321,353
Patented May 23, 1967

3,321,353
FILM SEALING AND CUTTING APPARATUS
Seymour Zelnick, Toms River, N.J., assignor to Weldotron Corporation, Newark, N.J., a corporation of New Jersey
Filed Dec. 10, 1963, Ser. No. 329,499
5 Claims. (Cl. 156—499)

This application is a continuation-in-part of my application Ser. No. 307,647 filed September 9, 1963, assigned to the assignee of my present application.

This invention relates to a method and apparatus for heat sealing and cutting thermoplastic films for various purposes, for example, but without limitation, for packaging or wrapping, or for forming bags or other containers or articles, etc. by heat sealing and cutting superimposed thermoplastic films.

In my application, Ser. No. 263,837 filed Mar. 8, 1963, now abandoned there is disclosed a method of and apparatus for heat sealing and cutting thermoplastic films by heating the films by means of an electrically energized radiant heater, in the form of a thin metal strip, along a predetermined line disposed between two pairs of film clamping members, with the result that the films melt and part along said lines and a beaded edge is formed at the sealed edges of the films.

The primary object of the present invention is to provide a heat sealing and cutting technique of the radiant sealing type which, while operable to heat, seal and cut thermoplastic films in general, is especially useful for heat sealing and cutting thermoplastic films which are wrinkled or folded or which for other reasons are difficult to seal.

Another object of the present invention is to provide a heat sealing technique according to which the superimposed films are heated directly by radiant heating element disposed at opposite sides of the assembly of superimposed films whereby both films are subjected simultaneously and directly to the sealing and cutting heat.

Another object is the provision of heat sealing and cutting apparatus having means for pressing the sealed beaded edge or edges of the cut and sealed film while such edge is still plastic under the influence of the heat imparted thereto by the heat sealing and cutting member or members.

A further object of the invention is to provide heat sealing and cutting apparatus wherein the film clamping or pressing members may be disposed in various positions laterally of the heating member, whereby to vary the distance of the film clamping members from the heating member.

Another object is to provide for cooling of the film pressing members and the sealed edge or edges of the films.

The above and other objects, features and advantages of the present invention will be fully understood from the following description considered in connection with the accompanying illustrated drawings of the present preferred embodiment of the invention.

In the drawings:

FIG. 1 is a vertical sectional view of a heat sealing apparatus embodying the present invention, showing the superimposed films in position preliminary to the operation of the apparatus;

FIG. 2 is a vertical sectional view of part of the apparatus shown by FIG. 1, illustrating the operation of the apparatus for heating, sealing and cutting the superimposed films;

FIG. 3 is a side view of one of the heating elements and its support;

FIG. 4 is a view generally similar to FIG. 1 showing another form of the invention;

FIG. 5 is a sectional view on the line 5—5 of FIG. 4;

FIG. 6 is a sectional view on the line 6—6 of FIG. 5;

FIG. 7 is a view of part of the apparatus shown by FIG. 4 in the condition wherein the superimposed plies are sealed and severed, and showing the sealed beaded edges;

FIG. 8 is a view similar to FIG. 7 showing the condition of the apparatus when the additional pressing members are operated to press or squeeze the sealed beaded edges;

Figure 13:
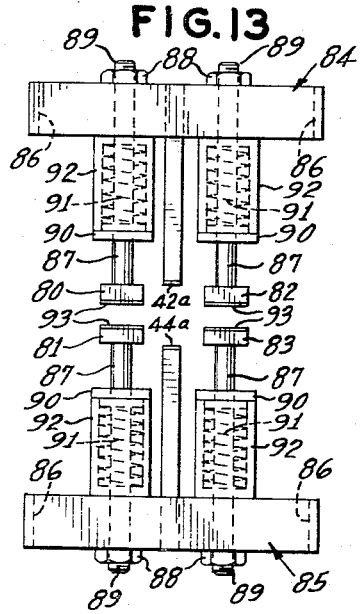
FIG. 13 is a view in elevation of part of heat sealing and cutting apparatus wherein provision is made for varying the distance of the companion film pressing members from the radiant heating member.

Referring now to the drawings in detail, the apparatus comprises a guide or frame 10 in which the clamping head 12 is slidably movable in any suitable way. As here shown, said clamping head is moved to the retracted position shown by FIG. 1 by tension springs 14 and may be moved downwardly to the projected position illustrated in FIG. 2 in any suitable way as by a cam or eccentric 16 secured to a shaft 17 journaled for turning movement in frame 10 and rotatable in any suitable way as by a manually or power operated crank or a lever mechanism (not shown). The clamping head 12 is provided with two clamping bars 18 and 20 which are disposed in laterally spaced relation and extend longitudinally in the direction of the lines at which the superimposed layers of film are to be sealed. Each of said bars is carried by a plurality of supporting members 22 spaced longitudinally of said bars, as will be readily understood, only one of said supporting members for each of said bars being shown. The supporting member 22 includes a guide member 24 which is slidable in a companion recess 26 in the guide head 12 against the force of a compression spring 28.

As shown by FIG. 2, upper clamping members 18 and 20 cooperate with companion lower clamping members 18a and 20a, respectively, in the manner illustrated by FIG. 2 and evident from a comparison of FIGS. 1 and 2. Said clamping members 18a and 20a are disposed in laterally spaced relation and extend longitudinally in confronting relation to the clamping members 18 and 20, respectively, as will be readily understood. The lower guide head 30 for clamping members 18a and 20a is stationary and comprises the guide recesses 32 which are similar to the guide recesses 26 for the upper clamping members 18 and 20. The lower clamping members 18a and 20a are carried by a plurality of longitudinally spaced supporting rods or studs 34, only one of said studs for each of said bars 18a and 20a being shown. The guide members 36 to which the said studs 34 are secured are movable in the guide recesses 32 and are spring loaded by the compression springs 38. It will be readily understood that the guide head 12 is moved downwardly into engagement to clamp the superimposed layers 40 of thermoplastic film resiliently but firmly between the companion clamping members 18 and 18a of one pair of clamping members and between the clamping members 20 and 20a of the other pair of clamping members.

As briefly stated above, heat is applied to the adjacent surfaces of both layers of thermoplastic film when said layers are clamped together. For this purpose, upper and lower metal bands 42 and 44 are mounted in the apparatus. The radiant heating elements can be formed of any high resistance alloy, for example nichrome, and have a greater width than thickness. The dimensions of these radiant elements are not critical, although a suitable radiant element would have a width of one eighth of an inch (⅛″) and a thickness of .018 inch. The lower band 44 may be stationary, while the upper band is movable with the guide head 12 being supported thereby for movement toward and away from the thermoplastic films, as is evident from an inspection of FIG. 1 in comparison with FIG. 2.

The support for the upper radiant heating element 42 comprises a plurality of longitudinally spaced rods 46 secured to the guide head 12 in the space between the laterally spaced guide recesses 26. More specifically, radiant heating element 42 is carried by a bracket 48 which is secured to said rods 46 in any suitable way. In order to maintain radiant heating element 42 taut when it is heated by the passage of electric current therethrough, one end of said element is secured to bracket 48 in any suitable way as by screw 50 and the opposite end of said radiant heating element is connected to one end of a tension spring 52, the other end of which is secured to a pin 54 fixed to bracket 48. It will be understood that if radiant heating element 42 expands longitudinally when heated, it is maintained taut by spring 52 and thereby prevented from sagging. The lower heating element 44 which is preferably stationary, although it could be movable, is positioned so that its upper surface is slightly below the adjacent surface of the lower film layer in the clamping condition of the two film layers illustrated in FIG. 2. A bracket support and device for maintaining the radiant element 44 in taut condition is provided, as indicated at 56, it being understood that said bracket and means for maintaining element 44 in taut condition is the same as that shown by FIG. 3, and that a plurality of rods 58 are connected to bracket 56 in longitudinally spaced relation in a manner generally similar to the connection of rods 46 to bracket 48 illustrated in FIG. 3. Bracket 56 is secured to the lower guide head 32 in any suitable way as by one or more cross members 60. It will be understood that the heating elements 42 and 44 are insulated from their metal supports and are each connected at its opposite ends to an electric current source.

The manner of practicing the method of the present invention according to FIGS. 1 to 3 is obvious from the above description, especially the brief description followed by the detailed description of the apparatus with reference to the drawings. Therefore, further description of the method or the operation of the apparatus is unnecessary. It is to be noted, however, that the portions of the film assembly which extend laterally beyond the clamps at the sealing line are heated simultaneously and directly at the opposite sides thereof by the radiant heating elements 42 and 44, respectively, as soon as the clamping operation takes place, whereby said portions are subjected to intense heat which rapidly melts said portions with flow to the adjacent sides, respectively, of the pairs of clamps resulting in the formation of sealed beaded edges of the film plies at said sides of the clamps.

In the form of the invention illustrated by FIGS. 4 to 8, provision is made for applying pressure to the sealed beaded edge while said edge is plastic and before the heating member is retracted. The apparatus includes the companion film clamping members 60, 61 and 62, 63 between which surface portions of the superimposed film plies 40 are clamped by operation of the mechanism indicated at 16 against the retractive action of the springs 14 substantially in the same way as described with reference to FIG. 1. In the apparatus of FIGS. 1 to 4, the radiant heating member 64 is in the form of a ribbon or flat wire similar to the ribbon 42 of FIGS. 1 to 4 except that it is preferably positioned, so that its wider face is vertically disposed. The means for applying pressure to the sealed beaded edges 65 to squeeze the sealed edge comprises the additional companion pressing members 66, 67 and 68, 69 which are slidably movable in relation to clamps 60, 61 and 62, 63, respectively, which position and guide said additional pressing members.

The upper pressing members 66 and 68 are moved downwardly by the plate 70 actuated by cams 71 against the retractive force of tension springs 72. A similar cam and spring arrangement 73, 74 is provided for the lower plate 75 which moves the lower pressing members 67 and 69 against the retractive force of tension springs 74 in unison with the movement of the upper pressing members 66 and 68.

The bead squeezing action of the apparatus of FIGS. 4 to 8 is apparent from FIGS. 7 and 8. FIG. 7 shows the condition of the sealed edges before they are squeezed by companion pressing members 66, 67 and 68, 69. It will be understood that the companion clamping members 60, 61, and 62, 63 are moved from the positions shown in FIG. 4 to film clamping positions and the portion of the film plies between the clamped surface portions of the film is heated by the radiant heater member 64 without contact of said heater with the films. This heating of the film plies results in the severing of the plies along a line extending in the longitudinal direction of the heater member and the heated portions melt and shrink back to near surfaces of the companion clamping members 60, 61 and 62, 63, respectively, as shown by FIG. 7, forming the sealed beaded edges 65. Thereafter the pressing members 66, 67 and 68, 69 are operated to the position illustrated by FIG. 8 to squeeze the beaded edges while they are still plastic and heated by member 64. This squeezing action improves the seal and is especially useful for obtaining good sealing of badly wrinkled plies of film. The squeezed edges are indicated at 65′ in FIG. 8.

Figure 9:
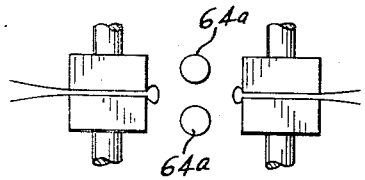
FIGS. 9, 10, 11 and 12 are views illustrating various cross sectional forms of the radiant heating member.
Figure 10:
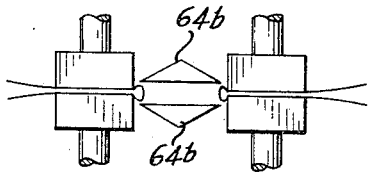
Figure 11:
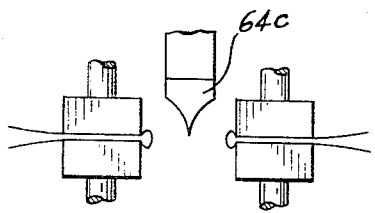
Figure 12:
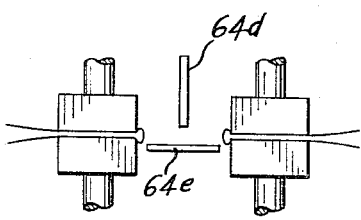

It will be understood that the apparatus of FIGS. 1 to 3 can be provided with the bead squeezing devices of FIGS. 4 to 8 and heaters shown by FIGS. 1 to 3 can be employed in the apparatus of FIGS. 4 to 8. Other forms of radiant heating members can be used as illustrated, for example but without limitations, by FIGS. 9 to 12. As shown by FIG. 9, two radiant heating members 64a in the form of round wires may be used. As shown by FIG. 10, the radiant heating members 64b can be triangular in cross section. In FIG. 11, the radiant heating member 64c can be of tapering configuration. As shown by FIG. 12, two flat radiant heating members 64d and 64e can be used, heating member 64d being vertically positioned and heating member 64 being horizontally positioned.

FIG. 13 illustrates how the distance of the clamping members 80, 81 and 82, 83 from the radiant heaters indicated at 42a and 44a may be varied. As here shown, the upper and lower frames 84 and 85 are slotted as indicated at 86 and the bars 87 which carry the clamping members are movable in slots 86 toward and away from said heaters and are secured in the desired positions by clamping nuts 88 which engage the threaded outer ends 89 of said bars. Each bar 87 has a flange 90 on which a compression spring 91 bears, said spring being positioned within a sleeve 92 which is engaged internally at its end remote from flange 90 by said spring. As shown by FIG. 13, each film clamping member, which is ordinarily made of metal is provided on its clamping surface with a thin cushioning layer of a material such as silicone rubber or Teflon.

Figure 14:
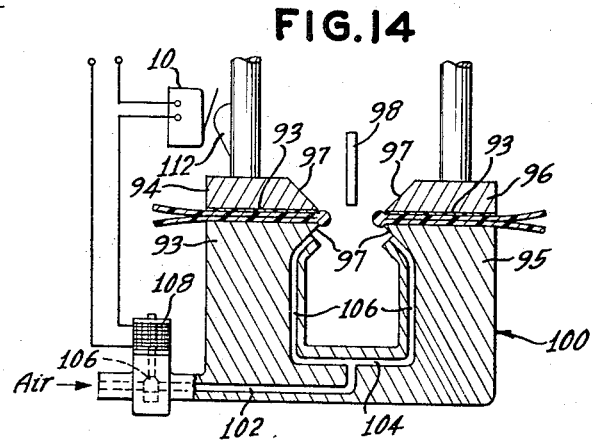
FIG. 14 is a sectional view of part of apparatus which is provided with means for cooling the clamping members and the sealed edges of the film.

Referring to FIG. 14, the apparatus may comprise companion stationary and movable clamping members 93, 94 and 95, 96. The movable clamping members 94 and 96 may be operated in the same way as the movable clamping members of FIG. 1. As here shown, the film clamping members have beveled sides 97 instead of vertical sides of the clamping members in the forms of the invention illustrated by FIGS. 1 to 13. A part of the radiant heating member is indicated at 98 and may be the same as the radiant heating member 64 of FIGS. 4 to 8 or any other form of radiant heating devices may be employed, for example but without limitation, the forms shown in FIGS. 1 to 3 and 9 to 13, inclusive. FIG. 14 of the drawings also discloses that the heat sealing apparatus of the present invention may be provided with means for air cooling the film pressing members and the sealed edge or edges of the film plies upon retractive movement of the radiant heating member 98. For this purpose the frame 100 on which the film clamping members 93 and 95 are carried is provided with an air duct 102 leading to air passage 104 which, it will be understood, extends longitudinally of the base 100, said air passage being defined by the inner surface of said base which confronts the U-shaped member 106 which also extends longitudinally of the base. Air duct 102 is connected to a source of air pressure through a solenoid operated valve 106. It will be understood that when the radiant heating member 98 is in position for heating and severing the film plies, valve 106 is closed, and that when the movable clamping members 94 and 96 are retracted together with the heating member 98, the solenoid indicated at 108 is energized for opening the valve 106. The electric circuit of solenoid 108 may be controlled in any suitable way, for example by a microswitch 110 actuated by a member 112 carried by one of the bars on which one of the movable film clamping members is mounted.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for heat sealing and cutting an assembly of superposed plies of thermoplastic film along a predetermined line, the apparatus comprising:
    a first pair of elongate laterally spaced clamping members,
    and a second pair of elongate laterally spaced clamping members;
    said first pair being movable to releasably clamp the film assembly against said second pair along both sides of a zone including said line so as to leave exposed both faces of the clamped film assembly within said zone;
    a heating member mounted between said first pair of clamping members for movement to a position adjacent to said clamped film assembly for cutting and sealing said clamped film assembly by melting a gap therein along said line and fusing together the superposed edges of the plies bounding the gap;
    a first pair of pressing members mounted in the space between said first pair of clamping members;
    a second pair of pressing members mounted in the space between said second pair of clamping members, opposed to and in register with said first pair of clamping members;
    means for moving said opposed pairs of pressing members relatively towards one another for pressing therebetween the fused edges of the plies bounding the gap melted into the assembly; and
    control means for moving said pressing members into their pressing disposition after said clamping members and heating members have been moved into their clamping and cutting positions respectively.

2. Apparatus according to claim 1 wherein said heating member is disposed between said pairs of clamping members and said pairs of pressing members within the gap in the film assembly at the time that said pairs of pressing members are pressing the plies.

3. Apparatus according to claim 2 wherein the lateral spacing between said first pairs of clamping and pressing members and said second pairs of clamping and pressing members is adjustable.

4. Apparatus according to claim 1 wherein:
    said first and second pairs of clamping members are respectively mounted to first and second support members which are relatively movable towards each other; and
    said first and second pairs of pressing members are respectively coupled to first and second additional support members which are relatively movable towards each other independently of said first and second support members.

5. Apparatus according to claim 1 further including:
    an additional heating member mounted between said second pair of clamping members for movement to a position adjacent to said clamped film assembly whereby said first mentioned heating member heats said clamped film assembly from one side thereof and said additional heating member heats said clamped film assembly from the other, opposite side thereof.

References Cited by the Examiner

UNITED STATES PATENTS

| | | | |
|---|---|---|---|
| 2,691,474 | 10/1954 | Olson | 156—499 |
| 3,015,600 | 2/1962 | Cook | 156—515 |
| 3,063,890 | 11/1962 | Saumsiegle | 156—583 |

FOREIGN PATENTS 664,424    6/1963    Canada.

EARL M. BERGERT, *Primary Examiner.*

DOUGLAS J. DRUMMOND, *Examiner.*